United States Patent [19]

Hassel et al.

[11] Patent Number: 5,265,735
[45] Date of Patent: Nov. 30, 1993

[54] MODULAR DESKTOP ORGANIZER FOR USE WITH COMPUTER KEYBOARD

[75] Inventors: H. Charles Hassel, Los Angeles; Alan Nash, Northridge; Michael J. Rocha, Los Angeles, all of Calif.

[73] Assignee: Microcomputer Accessories, Inc., Los Angeles, Calif.

[21] Appl. No.: 794,527

[22] Filed: Nov. 19, 1991

[51] Int. Cl.$^5$ .................................................. B41J 29/00
[52] U.S. Cl. .................................... 211/11; 206/214; 206/558; 211/126; 400/717
[58] Field of Search .................. 211/11, 50, 126, 194; 248/918; 400/717; 206/214, 224, 371, 558

[56] References Cited

U.S. PATENT DOCUMENTS

| | | |
|---|---|---|
| 275,771 | 10/1983 | Evans . |
| 290,852 | 7/1983 | Wang . |
| 311,210 | 10/1985 | Bottcher . |
| 415,063 | 11/1889 | Reid . |
| 638,131 | 11/1899 | Marshman . |
| 1,286,820 | 12/1918 | Sorensen . |
| 1,501,312 | 7/1924 | Coysh . |
| 2,535,743 | 12/1950 | Lundahl . |
| 2,862,626 | 12/1958 | Clare . |
| 3,036,687 | 10/1960 | Hoffman . |
| 3,436,855 | 4/1969 | Foley . |
| 3,476,257 | 11/1969 | O'Connell . |
| 3,857,482 | 12/1974 | Shelton ........................ 206/558 |
| 4,092,008 | 5/1978 | Fetter . |
| 4,176,743 | 12/1979 | Fitzpatrick ................... 211/50 X |
| 4,384,647 | 5/1983 | Schweizer ..................... 211/50 X |
| 4,406,368 | 9/1983 | Hermes ....................... 206/558 X |
| 4,429,796 | 2/1984 | Sussman ......................... 211/11 |
| 4,570,793 | 2/1986 | O'Neil et al. ................... 211/11 X |
| 4,919,276 | 4/1990 | Kim et al. ...................... 211/50 X |

OTHER PUBLICATIONS

Curtis Manufacturing Company, Inc., advertisement for Keyboard Organizer Model No. KO-1.

*Primary Examiner*—David A. Scherbel
*Assistant Examiner*—Derek J. Berger
*Attorney, Agent, or Firm*—Price, Gess & Ubell

[57] ABSTRACT

The desktop organizer includes a main tray for adhesively mounting to a top rear surface of the computer keyboard and a set of removable compartments for detachably mounting to a rear edge of the main tray. Each compartment is provided with a upper forward depending flange for engaging with an upper edge of the main tray. The compartments thus depend from the main tray along a rear surface of the keyboard. The compartments are arrangeable along the length of the main tray in a variety of different configurations. One or more of the compartments is sized for storing computer floppy disks. At least one of the compartments is sufficiently short such that, when positioned along the rear surface of the keyboard, it does not interfere with a keyboard cord extending outward from the rear of the keyboard. The provision of detachable and reconfigurable compartments allows the desktop organizer to be configured to avoid interference with access to disk drives of the computer. The invention thus provides a simple and inexpensive desktop organizer for mounting directly to a computer keyboard and for storing pencils, pens, computer disks and the like for easy access while using the computer.

14 Claims, 5 Drawing Sheets

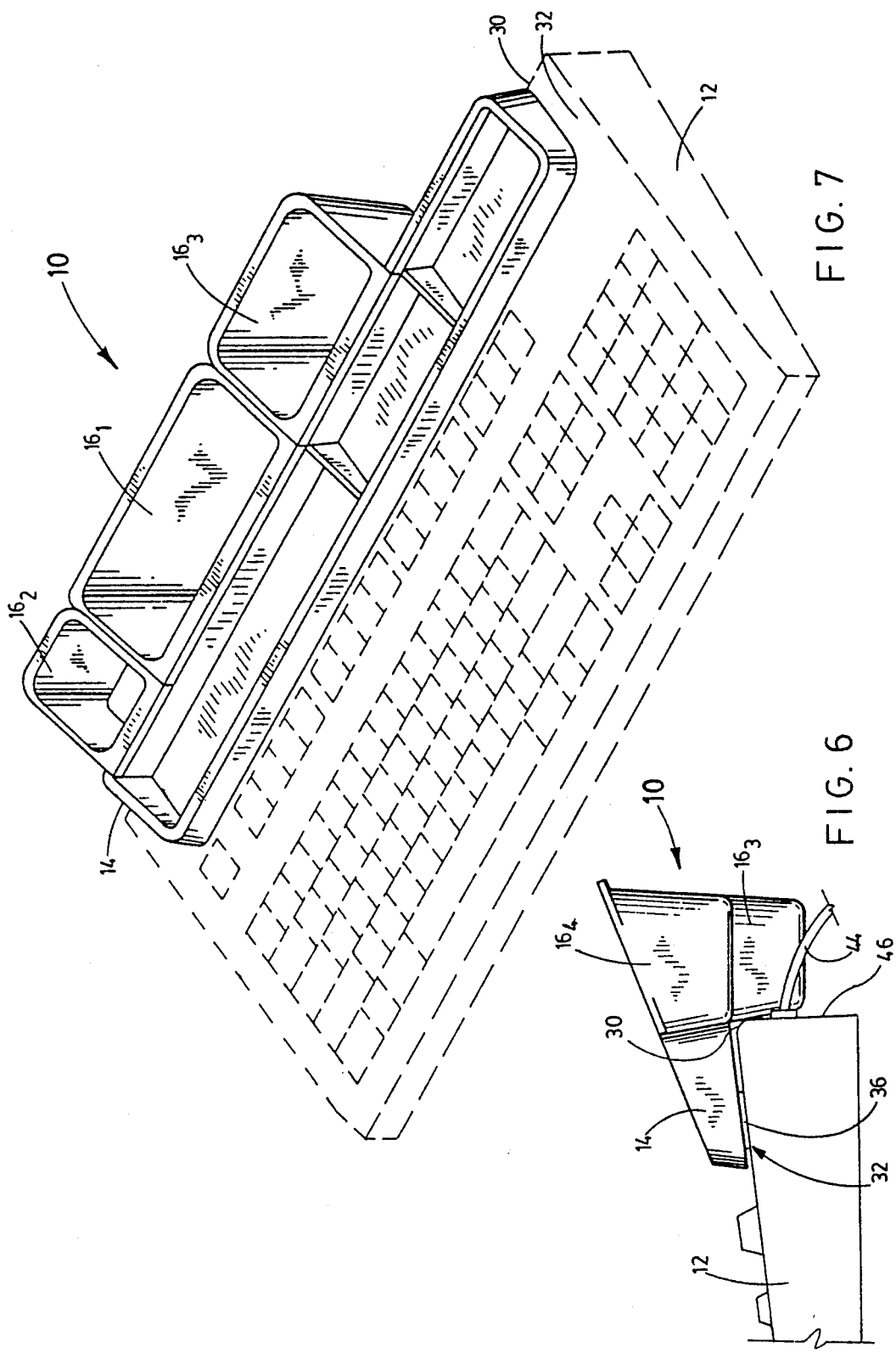

MODULAR DESKTOP ORGANIZER FOR USE WITH COMPUTER KEYBOARD

BACKGROUND OF THE INVENTION

1. Field of the Invention

The invention generally pertains to desktop organizers, and in particular to a desktop organizer for mounting to a computer keyboard.

2. Description of Related Art

A wide variety of desktop organizers are commonly used. A desktop organizer provides a set of compartments for storing and organizing, pens, pencils, paper clips, rubber bands, and the like. A typical desktop organizer is either provided with a means for mounting to an office wall or wall partition, or is provided with a base for resting the organizer on an office desk.

Typical desktop organizers are frequently not locatable for convenient access while using a personal computer or computer terminal. Frequently, the combination of a computer CRT and computer keyboard takes up a considerable portion of a desk, such that there is insufficient room to place a desktop organizer in close proximity. Alternatively, the computer CRT and computer keyboard are often located on a separate computer table. Such individual computer tables often have only sufficient desktop space for the CRT and the keyboard and do not provide additional space for a desktop organizer.

Accordingly, although a wide variety of desktop organizers are available, none are particularly well adapted for use with a computer or computer terminal. Rather, the typical desktop organizer is either not positionable in close proximity to a computer or computer terminal because of insufficient space, or, if positioned in close proximity to the computer keyboard, the organizer interferes with access to the computer keyboard, disk drives or mouse input device.

SUMMARY OF THE INVENTION

It is believed that it will apparent from the preceding that there is a need for a new and improved desktop organizer readably accessible while using a computer keyboard. Broadly, the invention is intended to provide a desktop organizer meeting or fulfilling this need.

Accordingly, it is an object of the invention to provide a desktop organizer for use with a computer keyboard.

It is another object of the invention to provide a desktop organizer for use with a computer keyboard which does not interfere with access to the computer keyboard, computer disk drives, and computer mouse input device.

It is a further object of the invention to provide a desktop organizer for use with a computer keyboard wherein the desktop organizer is provided with a set of compartments for storing computer floppy disks.

It is a further object of the invention to provide a desktop organizer for use of the computer keyboard wherein storage compartments of the desktop organizer are arrangeable in a variety of separate configurations.

It is a further object of the invention to provide a desktop organizer for use with a computer keyboard wherein the desktop organizer does not interfere with a computer keyboard cord extending from the rear surface of the keyboard.

These and other objects of the invention are achieved by providing a modular desktop organizer having a separable reconfigurable multi-compartmented tray for detachably mounting to a computer keyboard.

In accordance with a preferred embodiment, the desktop organizer includes a main tray for mounting to a top rear surface of the computer keyboard and a plurality of individual compartments for detachably mounting to a rear edge of the main tray. The main tray is attached to the keyboard by means of two-sided adhesive tape. The individual compartments each include a depending flange for engaging with a rear edge of the main tray such that the individual compartments depend from the main tray along the rear surface of the keyboard.

Each of the individual compartments is mountable at a plurality of locations along the rear edge of the main tray such that the compartments are arrangeable in a plurality of configurations.

Also in accordance with a preferred embodiment, at least one of the individual compartments is sized for receiving 5¼" computer floppy disks and at least one of the individual compartments is sized for receiving 3½" computer floppy disks. Also, at least one of the individual compartments is preferably sufficiently short, such that, when attached to the main tray, the short compartment does not interfere with a computer keyboard cord extending from a rear surface of the keyboard.

The desktop organizer of the invention thus provides a plurality of compartments for storing pens, pencils, rubber bands, computer disks, and the like. The desktop organizer is mounted directly to a computer keyboard such that it is always easily accessible by one using the computer keyboard. A particularly desirable feature is that the desktop organizer provides compartments for storing computer floppy disks adjacent to the computer keyboard for convenient access. The individual compartments are detachably mountable to the computer keyboard in a plurality of different configurations. In this manner, one can conveniently mount only one or two compartments if such is sufficient. Alternatively, one can mount a complete set of compartments to the computer to provide maximum storage space. The provision of reconfigurable compartments allows the desktop organizer to be configured in such a way to avoid interference with the disk drives of the computer. Also, the provision of at least one short compartment allows the organizer to be configured in such a way that the compartments do not interfere with a computer keyboard cord extending from a back surface of the computer keyboard.

The desktop organizer is preferably constructed of a durable resilient plastic to be inexpensive to manufacture, durable and easy to clean.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 6 is a side elevational view of the desktop organizer of FIG. 1 shown mounted to a computer keyboard.

FIG. 7 is perspective view of the desktop organizer of FIG. 1 showing only three of the separable compartments mounted in alternative configuration.

DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to a desktop organizer for use with a computer keyboard.

Figure 1:
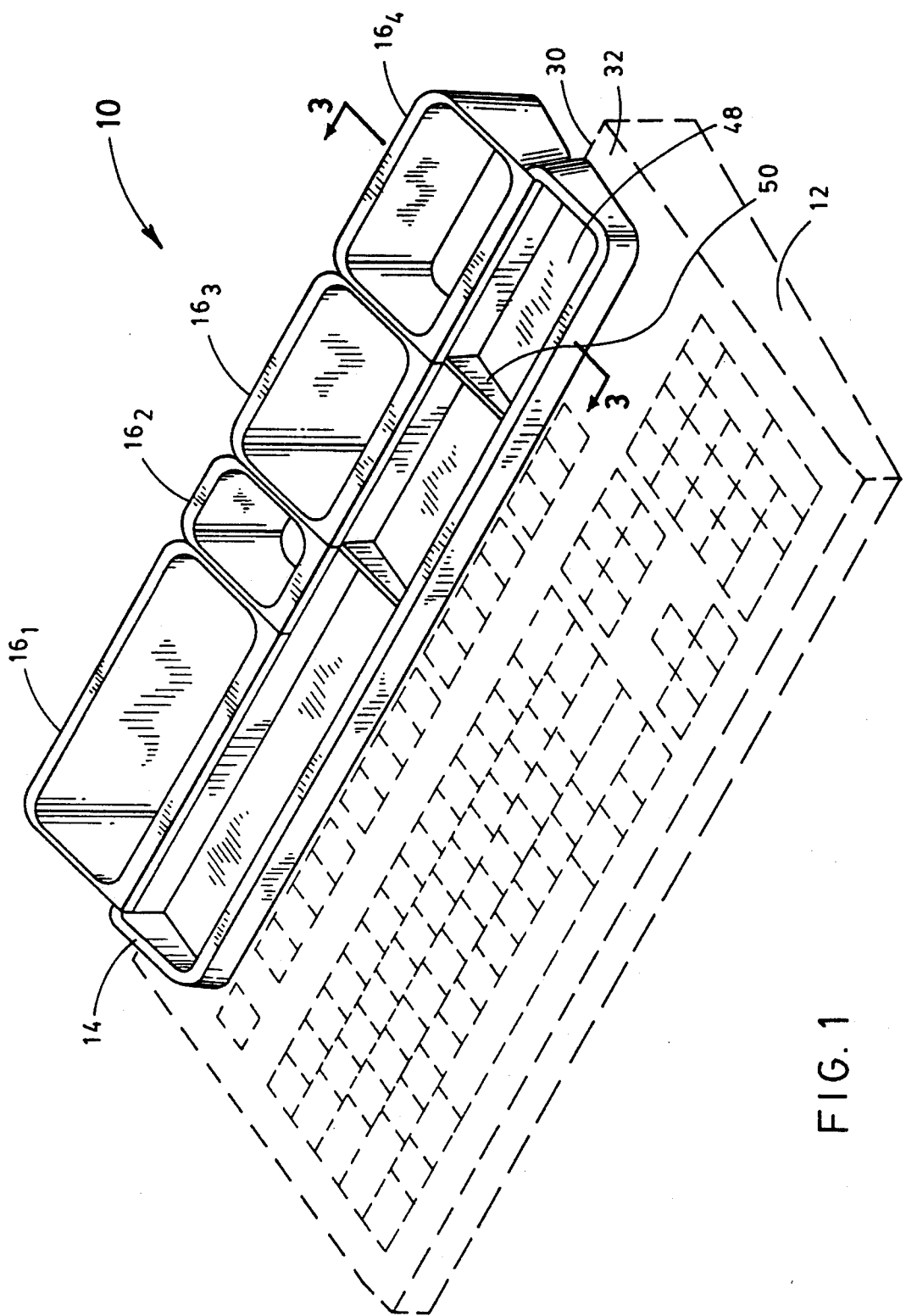
FIG. 1 is a perspective view of the desktop organizer constructed in accordance with a preferred embodiment of the invention shown mounted to a computer keyboard.

Referring to the figures, a preferred embodiment of a desktop organizer 10 is shown mounted to a computer keyboard 12 with keyboard 12 represented in phantom lines in FIGS. 1 and 7.

Figure 2:
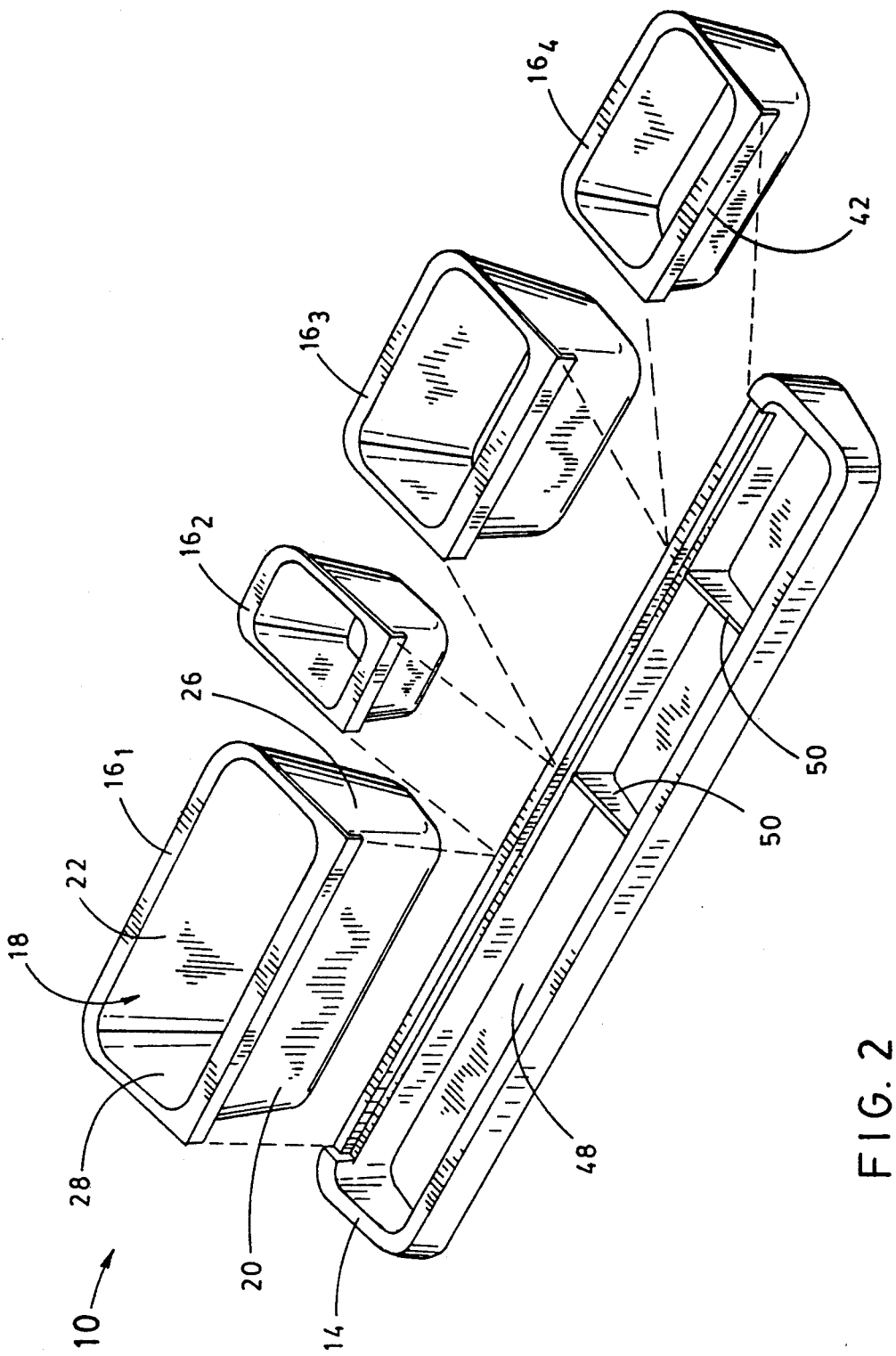
FIG. 2 is an exploded perspective view of the desktop organizer of FIG. 1 showing the various components thereof.

Keyboard organizer 10 includes a main tray 14 and set of detachable compartments generally denoted 16 and represented individually in the figures by reference numerals $16_1$, $16_2$, $16_3$, and $16_4$. As can be seen from FIG. 2, compartments 16 are each separable from each other and from main tray 14. Each compartment 16 comprises a generally rectangular basket having an upper opening 18 a front wall 20, a rear wall 22, a bottom wall 24, and opposing side walls 26 and 28, respectively.

Main tray 14 comprises a long, thin tray having a length slightly less than the width of a typical computer keyboard, and having a width approximately equal to the distance between the rear most set of keys of a typical computer keyboard, and a rear edge 30 of the computer keyboard. Thus dimensioned, main tray 14 is sized to fit substantially within and mountable to computer keyboard 12 along a top rear surface 32.

Main tray 14 includes a bottom surface 34 which is provided with a set of two-sided adhesive strips 36. Main tray 14 is positioned over top rear surface 32 of keyboard 12. Two-sided adhesive strips 36 adhere to both keyboard 12 and main tray 14, and thereby secure main tray 14 to keyboard 12. In this manner, main tray 14 is securely but detachably mounted to keyboard 14. Main tray 14 is removable from keyboard 12 by merely peeling adhesive strips 36 from keyboard 12.

Although shown mounted by means of adhesive strips, main tray 14 may be mounted to keyboard 12 by any of a variety of other means. In particular, a set of strips having engaging hook and clasp members, sold under the trade name Velcro, can be mounted to main tray 14 and keyboard 12 such as main tray 14 may be detachably mounted to keyboard 12 without the need for direct adhesive contact. Alternatively, one or more bracket members, not shown, can be provided on main tray 14 for clamping to keyboard 12.

Figure 3:
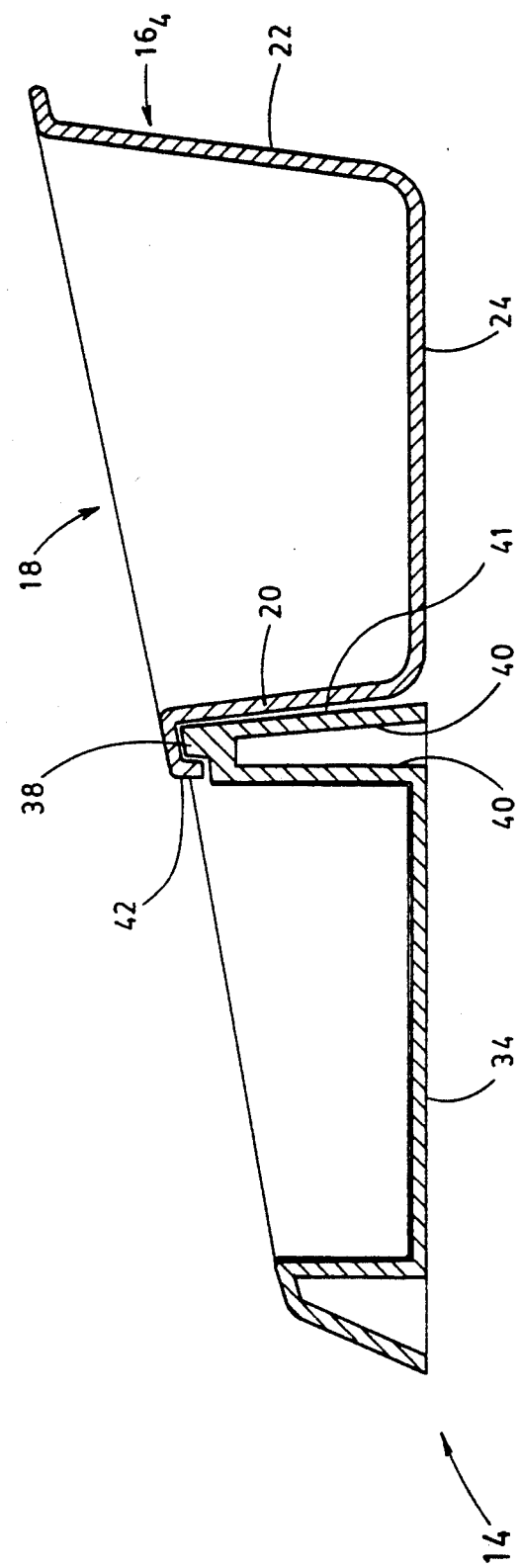
FIG. 3 is a cross-sectional view of the desktop organizer of FIG. 1 taken along line 3—3 of FIG. 1.
Figure 4:
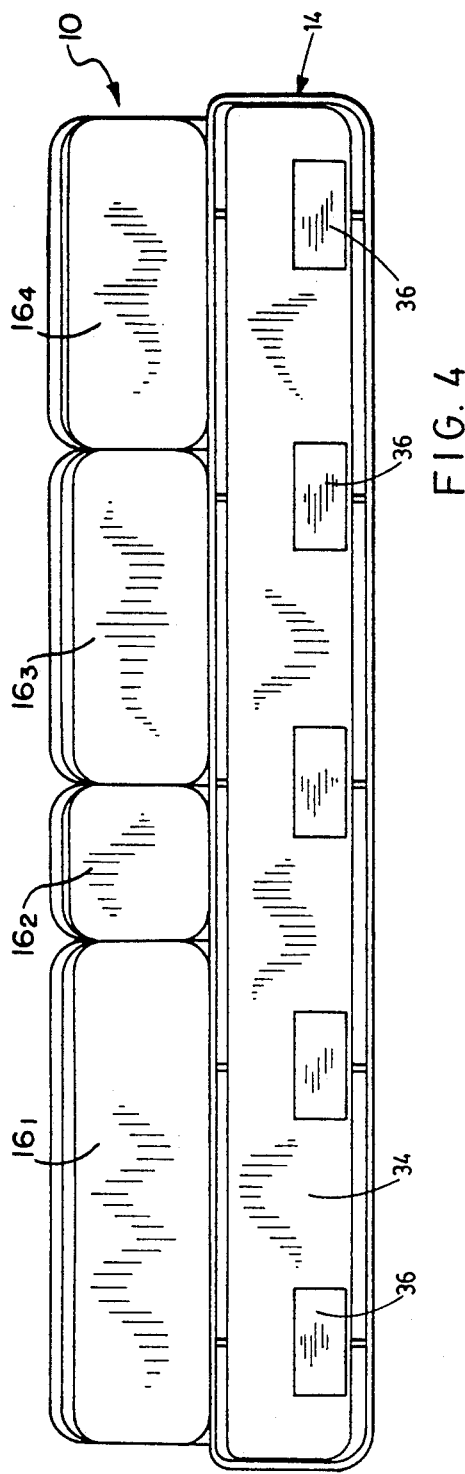
FIG. 4 is a bottom plan view of the desktop organizer of FIG. 1.

As shown most clearly in cross-section FIG. 3, main tray 14 includes an upper stepped edge 38 formed along a rear double wall 40. Each compartment 16 includes a forward depending flange 42 adapted for engaging with upper edge 38 of main tray 14. As can be seen from FIG. 3, depending flange 42 and upper edge 38 each have a generally rectangular cross-section with a cross-section of depending flange 42 being slightly larger than the cross-section of upper edge 38 such that depending flange 42 rests snugly over upper edge 38 with forward wall 20 of compartment 16 resting against a rear surface 41 of main tray 14.

Rear edge 38 extends along substantially the entire length of main tray 14 such that compartments 16 are mountable along the length of main tray 14. If desired, two or more of compartments 16 can be simultaneously mounted to main tray 14. As shown in FIGS. 1, 2, 4, 5 and 6, a total of four compartments are simultaneously mounted along main tray 14. Although shown in one particular arrangement, compartments 16 are arrangable or co-locatable in a variety of different configurations. Thus, for example, although not shown, only one or two of compartments may be mounted. In such a configuration, the one or two compartments need not be placed adjacent to each other but rather may be spaced apart along the length of main tray 14. Thus, for example, compartments $16_1$ and compartments $16_2$, may be mounted on opposing ends of main tray 14 with space remaining there-between. If one compartment is mounted, the compartment may be positioned at any point along main tray 14 and may be repositioned merely by sliding the compartment along main tray 14.

FIG. 7 shows a particular alternative arrangement of compartment 16 in which only three compartments are provided, $16_1$, $16_2$, and $16_3$, and with compartments $16_1$ and $16_2$ reversed from their orientation of FIG. 1.

Compartment $16_1$ is sized for receiving and storing $5\frac{1}{4}''$ computer floppy disks. Compartment $16_3$ is sized for receiving and storing $3\frac{1}{2}''$ computer floppy disks. Compartments $16_1$ and $16_3$ thus provide storage for computer disks and allow convenient access to the disks while the computer keyboard is in use. Compartments $16_2$ and $16_4$ are of somewhat smaller in size and are well suited for storing paper clips, rubber bands, and the like.

The ability to rearrange compartments 16 is highly desirable since it allows the compartments to be positioned such that their contents do not interfere with access to the computer disks drives. For example, when storing $5\frac{1}{4}''$ floppy disks in compartment $16_1$, the disks may block or obscure a disk drive, not shown, of a computer, also not shown. However, by reconfiguring the location of the compartments, for example by moving compartment $16_1$ from the left most end of main tray 14, interference with access to the computer disk drive is avoided.

Figure 5:
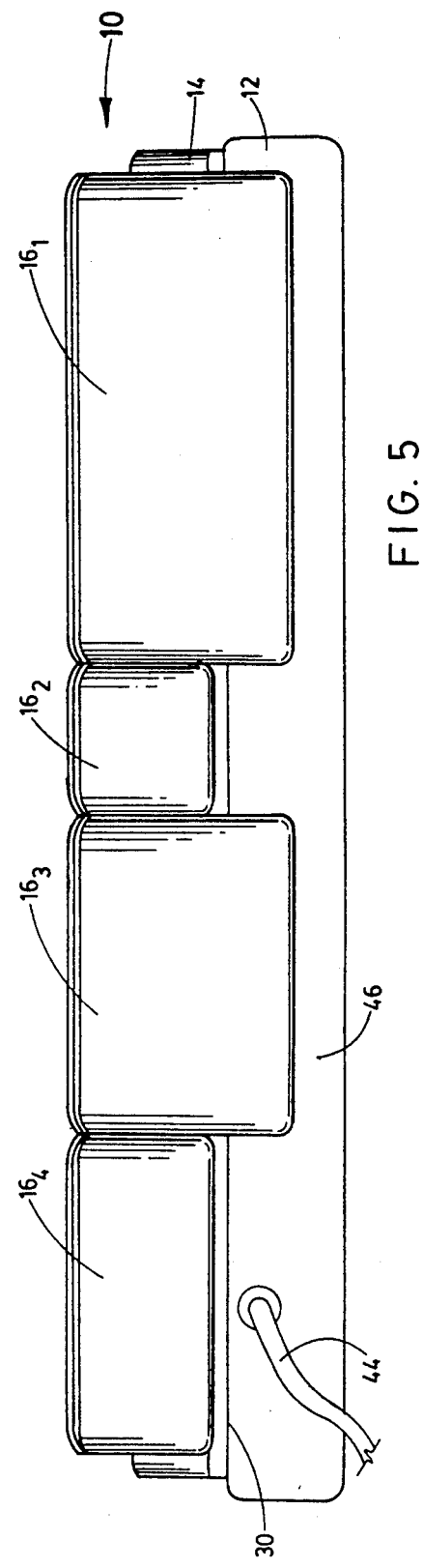
FIG. 5 is rear elevational view of the desktop organizer of FIG. 1 shown mounted to a computer keyboard.

A typical computer keyboard 12 includes a cord 44 extending from a back rear surface 46. As shown in FIGS. 5 and 6, however, compartments $16_1$ and $16_2$, depend from main tray 14 along a portion of back rear surface 46 of keyboard 12. If each of the compartments extended an equal length, then the compartments could not be simultaneously mounted to main tray 14 without interfering with cord 44. Consequently, it is desirable that at least one of the compartments is sufficiently short such that it does not interfere with keyboard cord 44. In the embodiment shown in the drawings, both compartments 16₂ and 16₄ are sufficiently short such that either could be positioned over cord 44 without interfering with cord 44. Of course, although shown as having a cord extending outward from a left end of back rear surface 46, keyboard 12 might alternatively have a cord extending from some other location along area surface 46. The provision of reconfigurable compartments 16, however, allows the compartments to be mounted in a configuration wherever one of the shorter compartments is always positionable above cord 44. Thus for example, if cord 44 extends outward from the center of back rear surface 46 of keyboard 12, desktop organizer 10 is easily reconfigured with compartment 16₂ interchanged with compartment 16₃. Thus, desktop organizer 10 is usable with a wide variety of different keyboard designs having a variety of different exit points for computer keyboard cord 44.

Although shown with a total of four compartments, desktop organizer 10 can be provided any number of compartments of differing size and shape. Of course, if a large number of compartments are provided, it may not be possible to simultaneously mount all of the compartments to main tray 14.

Main tray 14 is itself provided with a set of compartments or pockets 48 separated by interior walls 50. Pockets 48 are preferably sized for receiving and storing pencils, pens and the like or for storing paper clips or rubber bands and the like. In an alternative embodiment, not shown, interior walls 50 separating pocket 48 are repositionable along with the length of main tray 14 such that the length of pocket 48 is selectable and reconfigurable.

Main tray 14 and compartments 16 are constructed of any suitable material but a resilient plastic is preferred since resilient plastic allows organizer 10 to be durable and inexpensively manufactured. Of course, a variety of colors and surface textures can be provided for organizer 10.

Thus, the invention provides a desktop organizer conveniently mountable directly to a computer keyboard for easy access while using the computer keyboard. The desktop organizer provides a plurality of compartments for storing a variety of differently sized desktop articles such as pens, pencils and computer disks. The compartments of the desktop organizer are removable and rearrangeable in a variety of configurations.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein. Thus, the desktop organizer can be used with any combination of one or more of the compartments. Alternatively, desktop organizer 10 can be used without any of the replaceable compartments by merely using the pockets or compartments formed directly in main tray 14. The individual compartments can be co-located along the length of the desktop organizer in any of a variety of configurations. In this manner, the compartments can be positioned to avoid interfering with access to disk drives of the computer and to avoid interfering with a computer keyboard cord extending from a rear surface of the keyboard.

Those skilled in the art will appreciate that various adaptations and modifications of the just described preferred embodiment can be configured without departing from the scope and spirit of the invention. Therefore, it is to be understood that, within the scope of the appended claims the invention may be practiced other than as specifically described herein.

What is claimed is:

1. A modular desktop organizer for use with a computer keyboard, said keyboard including a top rear surface defined between a rear edge of said keyboard and a rearmost set of keys of said keyboard, said keyboard further including a back rear surface, said modular desktop organizer comprising:

a separable reconfigurable multi-compartmented tray comprising a main tray, said main tray being sized to fit substantially within and detachably mounted to said keyboard's top rear surface.

2. The modular desktop organizer of claim 1, wherein said main tray further includes a rear wall along which is formed an upper edge that is parallel to and above said keyboard's rear edge; and wherein said multicompartmented tray further comprises a plurality of individual separable compartments individually removably attached to said main tray's upper edge.

3. The modular desktop organizer of claim 2, wherein said plurality of compartments each includes a front edge having a downwardly-extending flange for engaging said main tray's upper edge.

4. The modular desktop organizer of claim 2, wherein said plurality of individual compartments are collocatable along said main tray's upper edge in a plurality of different arrangements.

5. The modular desktop organizer of claim 2, wherein each of said compartments extends downwardly from said main tray along said keyboard's back rear surface by a respective distance, and wherein at least one of said compartments extends downwardly a limited distance sufficient to avoid interference with a cord extending from said keyboard's back rear surface.

6. A modular desktop organizer for use with a computer keyboard, said keyboard including a top rear surface defined between a rear edge of said keyboard and a rearmost set of keys of said keyboard, said keyboard further including a back rear surface having a cord extending therefrom, said modular desktop organizer comprising:

a main tray including a bottom surface sized such that said bottom surface is positionable over and may abut said keyboard's top rear surface, said main tray further including a rear wall along which is formed an upper edge, means for mounting said main tray to said keyboard's top rear surface such that said main tray's upper edge is parallel to and above said keyboard's rear edge;

a plurality of individual compartments wherein at least one of said compartments is sufficiently short in depth such that a bottom of said at least one compartment is above the cord extending from the keyboard when said at least one compartment is mounted to said main tray's upper edge; and means for detachably mounting one or more of said individual compartments to said main tray's upper edge, said compartments being collocatable in a plurality of different arrangements along said main tray's upper edge;

whereby said plurality of compartments may be detachably mounted along said main tray's upper edge in a variety of separate configurations and aid at least one shallow compartment may be detachably mounted to said main tray's upper edge, directly above said keyboard's cord, without interfering with said cord.

7. The modular desktop organizer of claim 6, wherein said means for mounting said main tray to the keyboard comprises adhesive means for adhering the bottom surface of said main tray to the top rear surface of the keyboard.

8. The modular desktop organizer of claim 6, wherein said means for detachably mounting one or more of said individual compartments to said main tray's upper edge comprises a front downwardly-extending flange formed on each of said plurality of compartments, said front downwardly-extending flange for engaging said main tray's upper edge.

9. The modular desktop organizer of claim 6, wherein four of said compartments are provided.

10. The modular desktop organizer of claim 6, wherein one of said compartments is sized for closely receiving a plurality of 5¼-inch computer disks.

11. The modular desktop organizer of claim 6, wherein one of said compartments is sized for closely receiving a plurality of 3½-inch computer disks.

12. The modular desktop organizer of claim 6, wherein said main tray includes a plurality of interior compartments.

13. The modular desktop organizer of claim 6, wherein said main tray and said compartments are formed from a plastic material.

14. A modular desktop organizer for use with a computer keyboard, said keyboard including a top rear surface defined between a rear edge of said keyboard and a rearmost set of keys of said keyboard, said keyboard further including a back rear surface, said modular desktop organizer comprising:

a main tray having a plurality of interior compartments and including a bottom surface sized such that said bottom surface is positionable over and may abut said keyboard's top rear surface, said main tray further including a rear wall along which is formed an upper edge;

means for mounting said main tray's bottom surface to said keyboard's top rear surface such that said main tray's upper edge is parallel to and above said keyboard's rear edge;

a plurality of individual compartments wherein at lest one of said compartments is sufficiently short in depth such that a bottom of said at least one compartment is above the cord extending from the keyboard when said at least one compartment is mounted to said main tray's upper edge, each of said plurality of individual compartments including a front edge having a downwardly-extending flange for detachably engaging said main tray's upper edge;

whereby said plurality of compartments may be detachably mounted along said main tray's upper edge in a variety of separate configurations and said at least one shallow compartment may be detachably mounted to said main tray's upper edge, directly above said keyboard's cord, without interfering with said cord.

* * * * *